United States Patent
Hibbard et al.

(10) Patent No.: US 7,974,522 B2
(45) Date of Patent: Jul. 5, 2011

(54) SYSTEMS AND METHODS TO IMPROVE CONSUMER PRODUCT RELIABILITY AND LIFETIME OF A HARD DISK DRIVE BY REDUCING ITS ACTIVITY

(76) Inventors: Gary D. Hibbard, Suwanee, GA (US); Dennis L. Jesensky, Lawrenceville, GA (US)

( * ) Notice: Subject to any disclaimer, the term of this patent is extended or adjusted under 35 U.S.C. 154(b) by 1314 days.

(21) Appl. No.: 11/536,966

(22) Filed: Sep. 29, 2006

(65) Prior Publication Data

US 2008/0080843 A1    Apr. 3, 2008

(51) Int. Cl.
*H04N 5/89*    (2006.01)
*H04N 5/76*    (2006.01)

(52) U.S. Cl. .................. 386/335; 386/291; 386/298

(58) Field of Classification Search .............. None
See application file for complete search history.

(56) References Cited

U.S. PATENT DOCUMENTS

| | | | |
|---|---|---|---|
| 5,996,023 A | 11/1999 | Winter et al. | 709/253 |
| 6,337,716 B1 | 1/2002 | Yim | 348/554 |
| 7,818,474 B2 | 10/2010 | Hibbard et al. | |
| 2001/0053112 A1* | 12/2001 | Matsui | 369/47.3 |
| 2003/0099460 A1 | 5/2003 | Imada et al. | |
| 2003/0228140 A1 | 12/2003 | Bullock et al. | 386/125 |
| 2005/0111819 A1 | 5/2005 | Cormack et al. | 386/46 |
| 2005/0193284 A1 | 9/2005 | Yasuo | 714/48 |
| 2005/0246641 A1* | 11/2005 | Hori et al. | 715/723 |
| 2006/0129713 A1 | 6/2006 | Xie | |
| 2008/0147910 A1 | 6/2008 | Hibbard et al. | |

FOREIGN PATENT DOCUMENTS

| | | |
|---|---|---|
| EP | 1486980 | 12/2004 |
| EP | 1551023 | 7/2005 |
| EP | 1622385 | 2/2006 |
| JP | 2008146786 | 6/2008 |
| WO | WO 2004/051998 | 6/2004 |
| WO | WO 2004/061843 | 7/2004 |

OTHER PUBLICATIONS

Office Action dated Sep. 24, 2008, issued in U.S. Appl. No. 11/537,037.
Office Action dated Mar. 5, 2009, issued in U.S. Appl. No. 11/537,037.

(Continued)

*Primary Examiner* — Peter-Anthony Pappas
*Assistant Examiner* — Heather R Jones
(74) *Attorney, Agent, or Firm* — Merchant & Gould

(57) ABSTRACT

The present invention is directed towards reducing hard disk drive (HDD) activity by reducing the activity of an internal time shift buffer (TSB). The HDD may be included in a digital host communications terminal (DHCT). The TSB can switch between buffering a high definition quality to a standard definition quality of a streaming program. Additionally, the TSB can be disabled to prevent buffering of the streaming program. The reduced buffering of the TSB is determined by several factors including the temperature of the HDD, the health of the HDD, a set-up menu including TSB options, and/or whether there is a high definition television connected to the DHCT.

21 Claims, 4 Drawing Sheets

OTHER PUBLICATIONS

Office Action dated Oct. 28, 2009, issued in U.S. Appl. No. 11/537,037.
Office Action dated Apr. 26, 2010, issued in U.S. Appl. No. 11/537,037. Marsh B., et al.: "Flash memory file caching for mobile computers" System Sciences, 1994. vol. I: Architecture, Proceedings of the Twenty-seventh Hawaii International Conference on Wailea, HI, USA Jan. 4-7, 1994, Los Alamitos, CA, USA, IEEE Comput. SOC, Jan. 4, 1994, pp. 451-460, XP010096924.
U.S. Appl. No. 11/537,037, filed Sep. 29, 2006, entitled "Provisional Load Sharing Buffer for Reducing Hard Disk Drive (HDD) Activity and Improving Reliability and Lifetime", Inventors: Gary D. Hibbard, et al.

* cited by examiner

Set-Up Menu

TSB Activity:
    High Definition Quality    Disabled
    Standard Definition Quality    Enabled
    Disable TSB TSB Timing:
    High Definition Quality    7pm – 12am
    Standard Definition Quality    1am – 6pm TSB Delay:
    15 second buffer delay

SYSTEMS AND METHODS TO IMPROVE CONSUMER PRODUCT RELIABILITY AND LIFETIME OF A HARD DISK DRIVE BY REDUCING ITS ACTIVITY

RELATED APPLICATIONS

The present invention is related to Ser. No. 11/537,037 entitled "Provisional Load Sharing Buffer to Improve Hard Disk Drive (HDD) Reliability and Lifetime," having common inventors and concurrently filed herewith.

TECHNICAL FIELD

The present invention is generally related to a digital home communications terminal (DHCT) in a communications system and, more particularly, is related to systems and methods for reducing hard disk drive (HDD) activity.

BACKGROUND OF THE INVENTION

Hard disk drives (HDDs), more than most other electronic components, experience degradation in performance and eventual failure when subjected to temperature extremes that are often found inside digital home communications terminals (DHCTs) or other consumer products. The chance of failure is higher in proportion to the amount of hard drive activity at higher temperatures. Accordingly, once the HDD's platter and read/write heads begin to degrade, the resulting data errors cause the drive to work harder in an attempt to recover the errors, and this excessive activity increases the chance of even more degradation. There is a need, therefore, for systems and methods that decrease the HDD activity at appropriate times in order to increase the lifetime of the HDD.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is an illustration of an example set-up menu that is suitable for use in implementing the present invention.

DETAILED DESCRIPTION

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards the enablement of reducing HDD activity, thereby improving the reliability and increasing the lifetime of the HDD. In a DHCT, an HDD may be used to store programs for viewing later. Disadvantageously, in the event of an HDD failure, the stored programs are typically lost and unrecoverable. Therefore, the reliability and lifetime of the HDD in a DHCT, which may also be known as a digital video recorder (DVR) DHCT, is important to a consumer who has selected to record and save certain programs.

Figure 1:
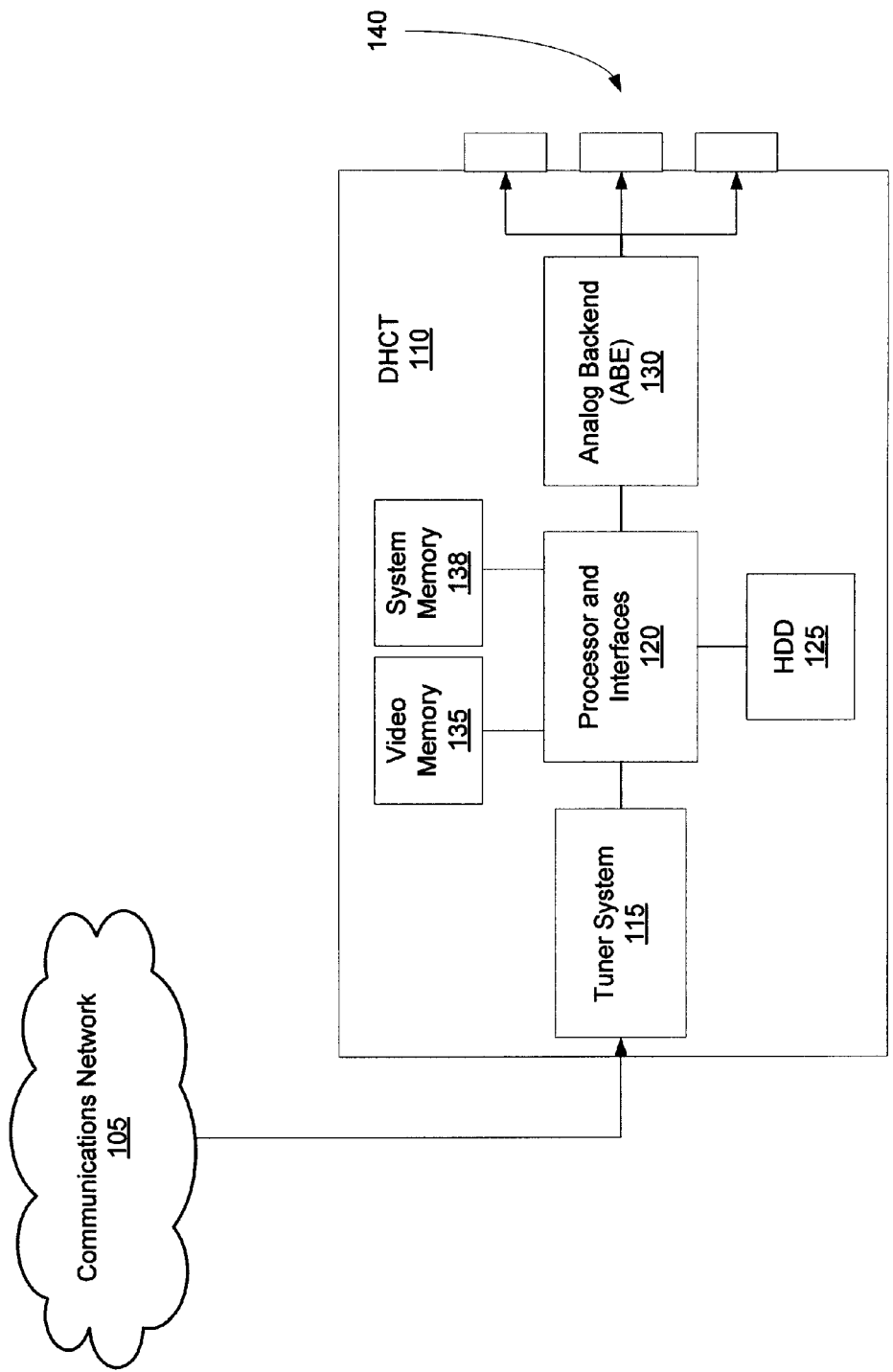
FIG. 1 illustrates a block diagram of a typical DHCT that is suitable for use in implementing the present invention.

FIG. 1 illustrates a block diagram of a typical DHCT 110 that is suitable for use in implementing the present invention. A communications network (CN) 105 provides programs to a plurality of DHCTs over coaxial cable, optical fiber, wireless, or any other means of transmitting signals. The DHCT 110 includes a tuner system 115 that receives the programs and filters a selected program on a channel based on commands from a processor and interfaces 120. The programs streaming on the tuned channel may then be provided directly to a coupled analog backend (ABE) 130 for immediate display, and/or the program may be stored in an HDD 125 for viewing in the future. Video images of the streaming programs are staged in video memory 135 just prior to being sent to the ABE 130 for display and are typically provided at a rate of 20 to 30 frames per second. The ABE 130 then handles other internal processes, such as receiving video data from the processor 120 and then assembles and sends the data to an appropriate output interface 140.

A DHCT 110 typically includes a plurality of different interfaces 140 for outputting the channel to different viewing devices depending upon its format. Some examples of a video interface include a coaxial radio frequency (RF) output that connects to nearly any television and outputs standard definition (SD) video. The television usually tunes the outputted program on channel 3 or 4. RCA phono connectors with composite NTSC or PAL video and audio outputs are also compatible with most of today's televisions. RCA connectors can carry SD or high definition (HD) analog video in RGB (red, green, blue) format or YPbPr format, which is a variation on RGB. A digitized version of YPbPr could also be carried on the three RCA connectors in a format referred to as YCbCr. The RCA interface is of better quality than the coaxial interface. An S-video interface is a small round mini-DIN connector with a slightly better quality than the RCA interface. High speed interfaces are available in DVI (digital video interface) and HDMI (high definition multimedia interface).

Figure 2:
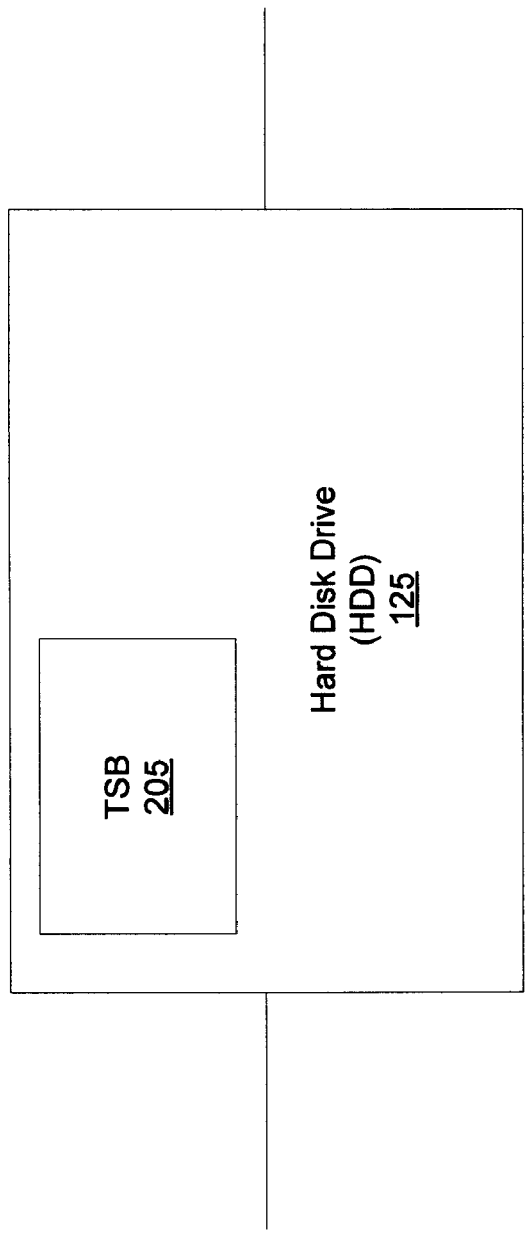
FIG. 2 illustrates an example of the HDD that is suitable for use in the DHCT of FIG. 1.

FIG. 2 illustrates an example of the HDD 125 that is suitable for use in the DHCT 110 of FIG. 1. The HDD 125 is used primarily to store programs for playback at a later time. The HDD 125 also comprises a time shift buffer (TSB) 205 for temporarily storing a copy of the program stream on the currently tuned channel regardless of whether or not the HDD 125 is storing the program for later viewing. The TSB 205 may store approximately one hour of programming, thereby allowing a user to use trick play functions, such as pause, rewind, fast forward, stop, etc, while viewing a stored program or a live program that is being tuned, or streamed. At the end of the TSB buffering limit, the oldest packets of the buffered program are continuously dropped to allow for further buffering of the program streaming on the tuned channel. If it is desired that the program also be saved, the program will be saved on the HDD 125 along with a copy being stored in the TSB 205 for the trick play functions.

When the tuned channel is changed to another channel, the packets stored in the TSB 205 are subsequently cleared or overwritten to allow for buffering of the new program streaming on the changed channel. If the previous program is being stored on the HDD 125, a first tuner continues to store the program while a second tuner filters the new program streaming on the changed channel to the TSB 205.

Conventionally, the program is buffered in the TSB 205 as received from the tuner system 115; for example, a high definition (HD) quality program is buffered to the TSB 205 in its original HD format, or in a compressed format from which the original HD can be reproduced. Accordingly, an HD formatted program is typically buffered at a higher rate (i.e., more bytes per second are written to the HDD 125) and with more data than would be buffered using standard definition (SD) formatting. Additionally, the program is always buffered in the TSB 205 even when a user is quickly changing channels. Furthermore, the TSB 205 continues buffering the program streaming on the tuned channel when the DHCT 110 remains on even while the television is turned off. Since the TSB 205 is included in the HDD 125 and is always buffering the program on a tuned channel, the HDD 125 is continuously active. Therefore, the higher the operating temperature of the HDD 125 along with the continuous activity, the more likely the HDD 125 will degrade and may prematurely fail. Accordingly, it is an object of the present invention to minimize the HDD activity. In accordance with the present invention, the HDD activity can be minimized by reducing the activity of the internal TSB 205 and thereby reducing the HDD activity.

In a preferred embodiment of the present invention, the tuned channel is buffered in the TSB 205, which is included in the HDD 125. Instead of buffering an HD quality of the program at all times, however, an SD quality of the program may be buffered when it is appropriate. In this manner, the buffered program does not contain as much data as a buffered HD program and, therefore, the HDD 125 does not work as much to store the data. It will be appreciated that the viewer of an SD television will not notice the difference during playback of a buffered SD program. Additionally, another option may be to stop buffering the program in the TSB 205, if necessary, to minimize the HDD 125 activity. For example, if the tuned program was selected for recording onto the HDD 125, the processor 120 provides the program to the HDD 125 for recording and bypasses the TSB 205 altogether. In this manner, the recorded portion of the program on the HDD is accessed for any desired trick play functions.

Figure 3:
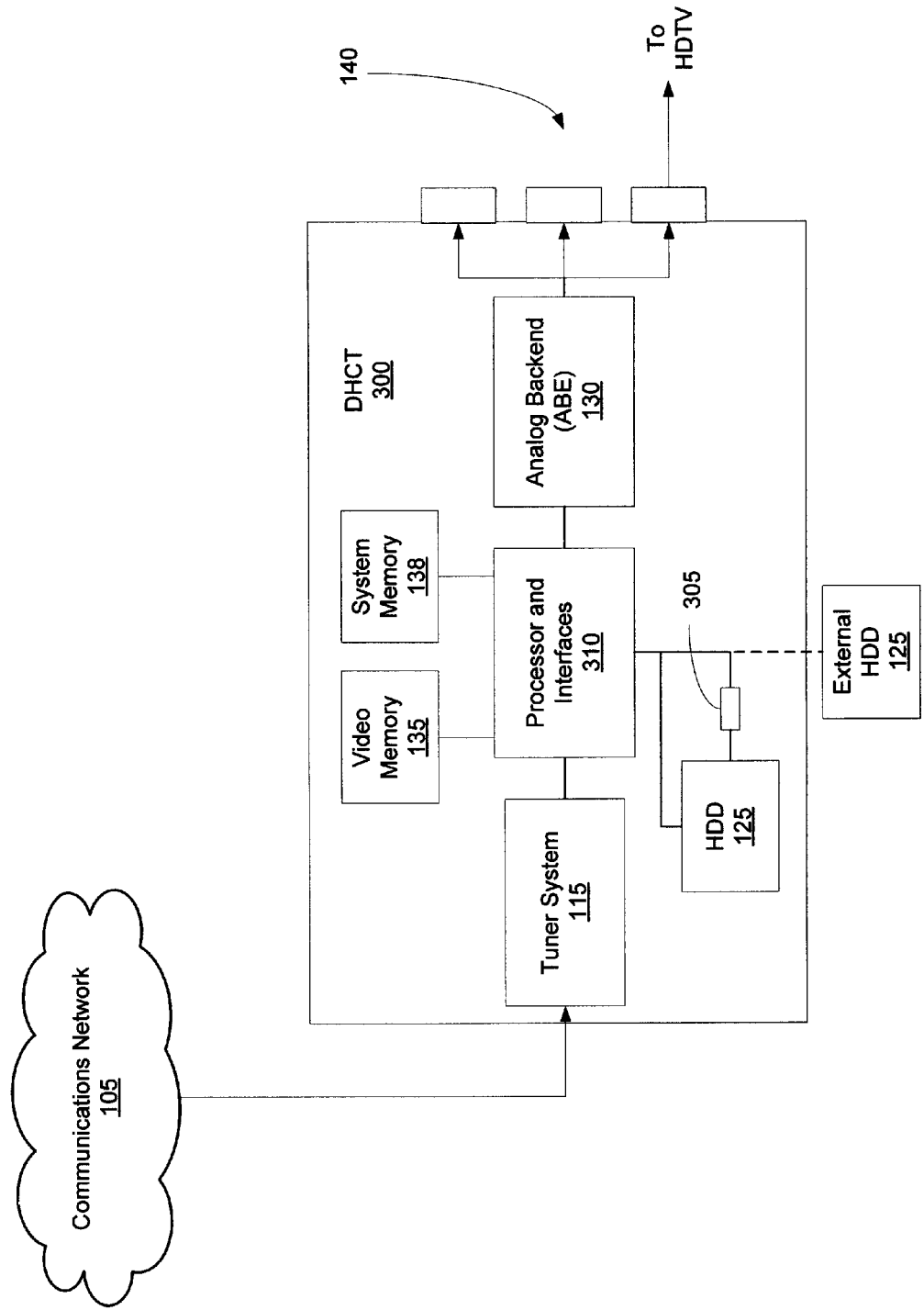
FIG. 3 illustrates a block diagram of a DHCT that is suitable for use in implementing the present invention.

FIG. 3 illustrates a block diagram of a DHCT 300 that is suitable for use in implementing the present invention. Buffering an SD quality of the program or stop buffering the program altogether can be decided based on several factors. In accordance with the present invention, a first factor may be to monitor the temperature of the HDD 125 with an external or internal temperature device 305. When the temperature rises to a predetermined threshold, the processor 120 may then begin to buffer a reduced quality of the program (i.e., an SD quality of an HD formatted program). Alternatively, the processor 120 may decide to stop buffering the program until the temperature lowers within an acceptable range.

Another factor may be to monitor the health of the HDD 125. The processor 310 may run periodic tests on the HDD 125 to analyze and report HDD performance. If it reports that the HDD 125 is beginning to show signs of malfunction, the TSB 205 can be instructed to begin buffering a reduced quality of the program or completely stop buffering the program. Optionally, buffering a reduced quality of the program or discontinuing buffering the tuned program, may be permanent until such time as the HDD 125 is serviced.

Further, the processor 310 may detect whether there is a viewing device connected to an HDMI interface, an RCA interface, or an S-Video interface on the DHCT 300. By way of example, the processor 310 is in contact with the connected television via the HDMI interface 315, which is a digital output port. The processor 310 collects such data as to whether the television is turned on, the resolution of the television, etc. In this manner, if the HDMI interface 315 is inactive, the processor 310 may always buffer an SD quality of all HD formatted programs rather than buffering an HD quality. Advantageously, the HDD 125 is less active until such time as an HD television is connected to the HDMI interface 315. Additionally, the TSB 205 is capable of storing longer portions of an SD program since there is less data being stored. Similarly, the processor 310 is capable of detecting whether a television or other device is connected to the RCA interface or the S-Video interface and the TSB default may be to buffer an SD quality of the HD formatted program.

FIG. 4 is an illustration of an example set-up menu that is suitable for use in implementing the present invention. The set-up menu 400 in DHCT 300 may be configured either by a user or by the system operator to reduce the activity of the TSB 205. TSB activity can be set to enable or disable HD quality and the SD quality buffering. If a user only uses an SD television, the HD quality can be disabled and the SD quality enabled. Another example includes disabling the TSB activity altogether. Another option may include TSB timing. For example, a user of an HD television may predominantly watch television from 7:00 pm to 12:00 am. When HD times are entered into the set-up menu, the TSB 205 buffers HD quality of HD formatted programs. At the other times of the day, an SD quality is buffered in the TSB 205. Additionally, a TSB delay may be programmed into the set-up menu. A delay in buffering a streaming program allows a user to change channels without the TSB 205 buffering the program for each changed channel until after the delay. For example, a delay of 15 seconds allows a user to change channels during the 15 seconds. When a channel remains the same for 15 seconds, the TSB 205 then begins buffering the program showing on that channel.

Accordingly, systems and methods have been described that increase the lifetime of an HDD 125 by reducing the activity of the TSB 205. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

The invention claimed is:

1. A method for reducing activity of a hard disk drive (HDD), the HDD including a time shift buffer (TSB) for buffering high definition and standard definition programs, the method comprising:
presenting a set-up menu that provides for certain times and activities wherein the set-up menu includes specifying a time delay for the TSB buffer in conjunction with channel changes, wherein when a channel is selected and is changed during the specified time delay, disabling the TSB, and wherein when a channel is selected and is not changed during the specified time delay, enabling the TSB to buffer the high definition and standard definition programs in accordance with the set-up menu; and
buffering a standard definition quality of the high definition program in accordance with the set-up menu.

2. The method of claim 1, wherein the set-up menu includes enabling or disabling the buffering step of one of a high definition quality of the high definition program, the standard definition quality of the high definition program, and buffering any of the high definition and standard definition programs.

3. The method of claim 1, wherein the set-up menu includes enabling the TSB to buffer a high definition quality of the high definition program during specific hours, wherein during non-specified hours, enabling the TSB to buffer the standard definition quality of the high definition program.

4. The method of claim 1, wherein the time delay comprises approximately 15 seconds.

5. The method of claim 1, wherein the time delay is one of the following: 15 seconds and less than 15 seconds.

6. The method of claim 1, wherein the set-up menu is configured by a user.

7. The method of claim 1, wherein the set-up menu is configured by a system operator.

8. A system for reducing activity, the system comprising:
   a hard disk drive (HDD) including a time shift buffer (TSB) for buffering first quality and second quality programs; and
   a processing unit coupled to the TSB, wherein the processing unit is operative to,
      presenting a set-up menu that provides for certain times and activities wherein the set-up menu includes specifying a time delay for the TSB buffer in conjunction with channel changes, wherein when a channel is selected and is changed during the specified time delay, disabling the TSB, and wherein when a channel is selected and is not changed during the specified time delay, enabling the TSB to buffer the first quality and second quality programs in accordance with the set-up menu, and
   buffering a second quality version of the first quality program in accordance with the set-up menu.

9. The system of claim 8, wherein the time delay comprises approximately 15 seconds.

10. The system of claim 8, wherein the time delay is one of the following: 15 seconds and less than 15 seconds.

11. The system of claim 8, wherein the set-up menu is configured by a user.

12. The system of claim 8, wherein the set-up menu is configured by a system operator.

13. The system of claim 8, wherein the first quality is a high definition quality.

14. The system of claim 8, wherein the second quality is a standard definition quality.

15. A method for reducing activity of a hard disk drive (HDD), the HDD including a time shift buffer (TSB) for buffering first quality and second quality programs, the method comprising:
   presenting a set-up menu that provides for certain times and activities wherein the set-up menu includes specifying a time delay for the TSB buffer in conjunction with channel changes, wherein when a channel is selected and is changed during the specified time delay, disabling the TSB, and wherein when a channel is selected and is not changed during the specified time delay, enabling the TSB to buffer the first quality and second quality programs in accordance with the set-up menu; and
   buffering a second quality version of the first quality program in accordance with the set-up menu.

16. The method of claim 15, wherein the time delay comprises approximately 15 seconds.

17. The method of claim 15, wherein the time delay is one of the following: 15 seconds and less than 15 seconds.

18. The method of claim 15, wherein the set-up menu is configured by a user.

19. The method of claim 15, wherein the set-up menu is configured by a system operator.

20. The method of claim 15, wherein the first quality is a high definition quality.

21. The method of claim 15, wherein the second quality is a standard definition quality.

* * * * *